United States Patent [19]

Pichat

[11] Patent Number: 5,177,305

[45] Date of Patent: Jan. 5, 1993

[54] WASTE INCINERATION PROCESS

[76] Inventor: Philippe Pichat, 18 rue des tournelles, Paris, France

[21] Appl. No.: 679,505

[22] Filed: Apr. 1, 1991

[30] Foreign Application Priority Data

Apr. 2, 1990 [FR] France .................. 90 04165

[51] Int. Cl.⁵ .............................. B09B 3/00
[52] U.S. Cl. .................... 588/257; 106/697; 106/DIG. 1; 106/705; 106/707; 106/708; 106/734; 501/155; 423/DIG. 18; 588/252; 588/256; 405/128
[58] Field of Search ........ 501/155; 106/DIG. 1, 106/697, 745, 763.4, 705, 708, 707, 734; 423/DIG. 18, DIG. 20; 588/252, 256, 257; 405/128

[56] References Cited

U.S. PATENT DOCUMENTS

| | | | |
|---|---|---|---|
| 4,112,033 | 9/1978 | Lingl ..................... | 501/155 |
| 4,215,232 | 7/1980 | Tylko ..................... | 13/2 |
| 4,432,666 | 2/1984 | Frey et al. ............... | 106/697 |
| 4,772,330 | 9/1988 | Kobayashi et al. ......... | 501/155 |
| 4,846,083 | 7/1989 | Serbent .................. | 110/349 |
| 4,873,207 | 10/1989 | Keller, Jr. .............. | 106/697 |
| 4,921,558 | 5/1990 | Lafser, Jr. et al. ....... | 501/155 |

OTHER PUBLICATIONS

Encyclopedia of Chemical Technology, Kirk-Othmer, 3rd ed., vol. 5, pp. 163–167.

Primary Examiner—Mark L. Bell
Assistant Examiner—C. M. Bonnar
Attorney, Agent, or Firm—Browdy and Neimark

[57] ABSTRACT

The process is the type wherein the solid portions of waste materials of all origins are crushed and ground to a granulometry of under 5 mm and then are heated to between 750° C. and 1,350° C. According to the invention, after the addition, if applicable, of liquid waste to obtain a pasty mass, a reagent is added to the latter, in pulverulent form having granules of under 500 microns based with calcium carbonate, silicium oxide and, possibly, aluminum and iron oxides in quantities to produce the following ratio after incineration:

$$\frac{CaO}{SiO_2 + Al_2O_3 + FeO_3} > 0.45$$

Application to the treatment of all types of waste by combustion.

5 Claims, No Drawings

WASTE INCINERATION PROCESS

BACKGROUND OF THE INVENTION

1. Field of the Invention

This invention pertains to the field of treating waste products by combustion. It applies especially to the incineration of waste materials and mixtures of waste materials in all forms (solid, sludge, liquid) of all types (urban, industrial, hospital, etc.) and which can present environmental hazards (toxic, radioactive waste, etc.).

2. Description of the Prior Art

Waste incinerators, of which there are a variety of types such as static, rotating hearth, grid, fluid bed, plasma, etc., currently present a number of disadvantages. Among those disadvantages, the following can be cited:

- The lack of polyvalence, because the same type of incinerator generally can only treat certain types and forms of waste;
- Unsatisfactory fixation of incineration products, and primarily halogens, anhydrous gases, acids, nitrogen oxides, as well as heavy metals;
- Insufficient destruction of particularly stable products such as organochlorine compounds;
- Rapid deterioration of refractory walls due primarily to the presence of melted alkaline salts;
- Unsatisfactory hourly output taking into account the difficulties in heat evacuation;
- Frequent need to use a feed of oxygen-enriched air.

Of course, fluid bed-type incinerators ensure the correct destruction of certain types of waste, but said waste must be composed of fine particles, having a homogeneous granulometry, and the compound must only contain a small proportion of easily-fusible products, such as alkaline salts, in particular. Indeed, few waste materials meet these conditions, if only, for example, sludge from urban waste biological purification plants. However, in this case, the smoke from the incinerators contains toxic gases such as HCl, NOx, $SO_2$, $SO_3$, etc., which must then be treated with lime to produce yet another waste product.

SUMMARY OF THE INVENTION

One of the purposes of the invention is to treat, in the same incinerator, a wide variety of wastes of different origins and dimensions, as well as in different states, and in mixtures (pastes, solids, liquids).

Another goal is to fix pollutant elements of waste materials as quickly as possible, and at the molecular or atomic scale.

Another goal, which is particularly important, is to eliminate the use of costly additives such as lime, Portland cement or equivalent products having high caloric contents.

Finally, on the technological level, the purpose is to improve the mechanical, thermal and chemical inertia of the furnace and to increase the capacity of a given furnace to destroy waste products for a given investment.

These goals and others which will emerge from the description can be reached through the process according to the invention, wherein, after the crushing and grinding of the solid portions of the waste material, then, if applicable, addition of liquid wastes to produce a pasty mass, combustion is performed, while adding to said paste a reagent in the form of granules whose average diameter is under 500 microns, comprising a product rich in calcium carbonate, silicium oxide, and, if applicable, aluminum and iron oxides.

The quantity of reagent added varies, of course, depending on the types and nature of the waste to be incinerated, but it is adjusted so that the output and final product yield concentrations of the following type:

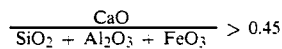

$$\frac{CaO}{SiO_2 + Al_2O_3 + FeO_3} > 0.45$$

The following can be cited, on an illustrative basis, among the numerous products that may be suitable as a reagent according to the invention: marl, mixtures of limestone and clay containing at least 70% limestone, mixtures of limestone and silicious products, siliceous limestone sand, raw preparations of cement and hydraulic cement, quarry material wash products, etc.

Such reagents primarily have the advantage of being inexpensive and creating highly endothermic reactions during the waste combustion process (due to decarbonation of the limestone), unlike conventional incineration with the addition of lime or cement. Accordingly, the temperature can be lowered substantially, and thus much more waste can be burned in a given furnace and with the same investment.

In practice and without limiting the invention to such interpretations, during combustion, the above-mentioned reagent, in this case known as $R_1$, generates a reagent $R_2$ essentially containing CaO (through the decarbonation of $CaCO_3$) crystallographically-modified silica, and, if applicable, aluminum and ferric oxide. Said reagent $R_2$ fixes the pollutant agents of the waste by encapsulation and, during incineration, it also transforms into $R_3$ compounds which can contain, for example, metakaolin (CaO, $SiO_2$), surface-activated silica, products such as: $(CaO)_4 Al_2O_3 SO_4$, $(CaO)_4 Al_2O_3$, $Fe_3O_4$, $(CaO)_5$, $(SiO_2)_2 SO_4$, $(CaO)_{12} (Al_2O_3)_7 X_2$ (X=halogen), chlorinated $(CaO)_2 SiO_2$ (if the waste is chlorinated) as well as a considerable number of solid solutions that have trapped metals, including heavy and toxic metals.

As we know, waste incineration produces 3 major groups of byproducts: cinders, fly ash (FA) and smoke purification waste (SPW).

In the case of the invention, the cinder part obtained cannot be lixiviated. Through the use of products ($R_1$) rich in limestone and silica, we can dispense with adding an outside reagent to produce insoluble and inert solids. It is sufficient to add a small amount of water or aqueous waste. Nonetheless, if necessary, this method can be used to treat cinder-type waste obtained using one of the methods described for FA and SPW in French Patent Applications Nos. 89 03586 and 89 035787 of Mar. 20, 1989.

DESCRIPTION OF THE PREFERRED EMBODIMENT

As an example embodiment of the process according to this invention, below is the summary of the treatment of a type of waste known to be very difficult to incinerate properly, i.e., industrial waste containing chlorinated organic matter.

To this end, a rotary kiln endowed with a post-combustion device was used, although a cyclone furnace can also be used. The solid portion of the waste to be treated was run through a crusher—shredder, and then a grinder, to produce particles having an average size of under approximately 5 mm. Next, in a mixer, liquid waste (water treatment sludge) was added to produce a paste, and then reagent $R_1$, finely pulverized to less than 200 microns, was added. Said reagent, $R_1$, composed of limestone and clay, had the following composition: 77.1% $CaCO_3$; 13.9% $SiO_2$; 2.6% $Al_2O_3$; 2.3% $Fe_2O_3$; the rest being composed essentially of alkaline oxides. The waste was treated at the rate of 3 tons per hour in the following proportions:

|  | Net Calorific Value (NCV) |
|---|---|
| Ground solid portion: 1,140 kg/hour | 4,000 |
| High-NCV type liquids: 990 kg/hour | 8,500 |
| Low-NCV type liquids: 270 kg/hour | 1,500 |
| Chlorinated products: 450 kg/hour | 1,000 |
| Pulverized $R_1$ reagent: 300 kg/hour | 500 |

The waste was introduced into the furnace using one or more burners, preferably the coaxial type; a special burner can also be used for chlorinated waste, for example, pyralene type. The flame temperature was approximately 1,000° C. and generally between approximately 750° and 1,350° C.

In the final products obtained, it was found that the smoke had much lower contents of $Cl_2$, $SO_2$, $SO_3$, etc., than those obtained with the conventional treatment of waste with lime or cement. HCl levels were under 100 mg/nano m³. The composition essentially contained $R_3$ type products described above, and small quantities of $R_1$ and $R_2$.

In order to transform this waste into an insoluble and compact material, it was treated with a small amount of water or product containing water as indicated in the aforementioned patents.

For example, to 150 parts (weight) of $R_3$ was added 20 parts of a SPW from a conventional household garbage incinerator, mixed vigorously with 100 parts of a mixture of pasty industrial waste (as a source of water) having a chemical oxygen demand (COD) of 9,000 mg/l, a pH of 7 and the presence of metals such as: Pb: 0.5 ppm; Cu: 90; Cd: 2; Zn: 3; Fe: 0.4; and Al: 20 (quantities in ppm: parts per million). Solidification occurred in less than one hour. After 10 days, the hard material was subjected to a lixiviation test according to DIN standard 38414. The following results were obtained: COD: 200 mg/l; Pb: 0.2; Cu: 0.1; Cl: 0.1; Zn: 0.1; Fe: 0.1; Al under 0.5 (all quantities expressed in ppm).

We will note that the final $R_3$ type product obtained on completion of incineration and possibly from the post-combustion chamber was partially composed of fine particles (FA, SPW) and partially composed of melted cinders, non-crystallized due to fast cooling upon leaving the furnace, serving in a hardening capacity. These cinders have pozzolanic hydraulic properties, and thus set quickly with water.

The process according to the invention can be implemented in any existing type of incinerator, with no structural modifications.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. In a process for incinerating mixtures of wastes of all origins that contain halogen containing compounds, wherein the solid portions are crushed and ground to a granulometry size under approximately 5 mm, a liquid waste is added to produce a pasty mass, and then the entire mixture is heated to approximately 1,000° C. the improvement comprising, incorporating into said mixture before heating a reagent in the form of a powder having granules of under 500 microns, containing a product rich in calcium carbonate, silicon oxide, aluminum and iron oxides, the quantity of reagent being measured to obtain the following ratio in the final incinerated product:

$$\frac{CaO}{SiO_2 + Al_2O_3 + Fe_2O_3} > 0.45.$$

2. Process according to claim 1, wherein said reagent is selected from the group consisting of marl, a mixture of limestone and clay containing at least 70% clay, a mixture of limestone and silicious products, silicious limestone sand, raw preparations for the manufacture of Portland cements or hydraulic limes, and quarry material wash products.

3. Process according to claim 1, wherein said final incinerated product having hydraulic-pozzolanic properties is transformed into a hard and insoluble material by mixing with water or a waste material containing water.

4. A solid incinerated composition produced by the process of claim 1 comprising at least one halogen containing compound and at least one compound selected from the group consisting of metakaolin, surface activated silica, calcium sulfo-aluminates $(CaO)_4Al_2O_3SO_4$, calcium ferro-aluminates $(CaO)_4Al_2O_3Fe_3O_4$, $(CaO)_5(SiO_2)_2SO_4$ and $(CaO)_{12}(Al_2O_3)_7X_2$, where X is a halogen, and further contains at least one heavy and toxic metal containing compound.

5. Compounds according to claim 4, wherein they also contain chlorinated $(CaO)_2 SiO_2$.

* * * * *